(12) United States Patent
Connors (10) Patent No.: US 11,231,128 B2
(45) Date of Patent: Jan. 25, 2022

(54) IN-TRENCH PIPELINE BALLAST DEVICE

(71) Applicant: 1552818 Ontario Limited, London (CA)

(72) Inventor: Geoff Weyman Connors, London (CA)

(73) Assignee: 1552818 ONTARIO LIMITED, London (CA)

( * ) Notice: Subject to any disclaimer, the term of this patent is extended or adjusted under 35 U.S.C. 154(b) by 0 days.

(21) Appl. No.: 16/456,465

(22) Filed: Jun. 28, 2019

(65) Prior Publication Data
US 2020/0003335 A1 Jan. 2, 2020

Related U.S. Application Data

(60) Provisional application No. 62/691,177, filed on Jun. 28, 2018.

(51) Int. Cl.
*F16L 1/06* (2006.01)
*F16L 1/24* (2006.01)
*F16L 1/028* (2006.01)

(52) U.S. Cl.
CPC .............. *F16L 1/06* (2013.01); *F16L 1/028* (2013.01)

(58) Field of Classification Search
CPC ....... F16L 1/028–036; F16L 1/06; F16L 1/11; F16L 1/123; F16L 1/24; B65D 33/007; B65D 88/1631; B65D 88/1643; B65D 88/1668; E02B 3/108
See application file for complete search history.

(56) References Cited

U.S. PATENT DOCUMENTS

| 3,827,471 | A | * | 8/1974 | Gregory | B65D 88/1612 222/181.3 |
| 5,385,430 | A | * | 1/1995 | Connors | E02D 27/38 405/157 |
| 6,000,604 | A | * | 12/1999 | Lapoint, III | B65D 88/1625 229/117.35 |
| 6,390,154 | B1 | * | 5/2002 | Hall | E02B 3/108 141/314 |
| 6,520,403 | B1 | * | 2/2003 | Lapoint, III | B65D 77/062 229/117.35 |
| 7,344,338 | B2 | * | 3/2008 | Willis | F16L 1/028 405/172 |
| 7,922,421 | B2 | * | 4/2011 | McGillick, Sr. | E02B 3/127 405/16 |

(Continued)

*Primary Examiner* — Frederick L Lagman
*Assistant Examiner* — Stacy N Lawson (57) ABSTRACT

A conduit weighting device has a container to contain ballast. The container is formed from flexible sheet material and has a top opening to receive the ballast. The device has flaps extending from respective opposite edges of the top opening of the container. The container forms an underside channel sized and shaped to receive a conduit for conforming placement of the conduit weighting device on the conduit to weight the conduit. The flaps are sized and shaped: when in an open arrangement, to extend beyond edges of a trench containing the conduit to hold open the top opening while receiving the ballast material; and when in a closed arrangement, to close the top opening of the container. The weighting device may be placed on an entrenched conduit before filling, and then filled in place with locally-available backfill. The device may be transported to the site in a collapsed compact form.

24 Claims, 4 Drawing Sheets (56) References Cited

U.S. PATENT DOCUMENTS

| | | | | |
|---|---|---|---|---|
| 8,262,320 B2* | 9/2012 | Gunn | ................. | F16L 1/24 |
| | | | | 383/24 |
| 8,360,688 B2* | 1/2013 | Gunn | ................. | F16L 1/24 |
| | | | | 383/24 |
| 8,777,034 B1* | 7/2014 | Town | ................. | B65D 90/046 |
| | | | | 220/1.6 |
| 9,217,516 B2 | 12/2015 | Connors | | |
| 9,758,939 B2* | 9/2017 | Adams | ................. | E02B 3/108 |
| 10,246,843 B1* | 4/2019 | Adams | ................. | E02B 3/108 |
| 2014/0255104 A1* | 9/2014 | Connors | ................. | F16L 1/06 |
| | | | | 405/184.4 |
| 2015/0337987 A1* | 11/2015 | Hamman | ................. | E02D 17/08 |
| | | | | 405/184.4 |
| 2015/0354161 A1* | 12/2015 | Adams | ................. | E06B 9/00 |
| | | | | 405/116 |
| 2019/0075738 A1* | 3/2019 | Manning | ................. | A01G 24/50 |
| 2020/0123725 A1* | 4/2020 | Adams | ................. | B65D 88/1625 |

* cited by examiner

IN-TRENCH PIPELINE BALLAST DEVICE

This application claims the benefit of priority under 35 U.S.C. § 119(e)(1) of U.S. Provisional Patent Application Ser. No. 62/691,177, filed Jun. 28, 2018, the entire contents of which are incorporated herein by reference.

FIELD OF INVENTION

The present disclosure concerns buried conduit ballast systems.

BACKGROUND OF THE INVENTION

When installing conduits, such as pipes and pipelines, it is common for a trench to be dug, a conduit to be emplaced in the trench, and the conduit to be buried in the trench under backfill. Such conduit emplacements, however, are often subject to various forces, such as mechanical, hydrodynamic, and hydrostatic forces that can cause displacement of the conduit from its originally installed position. Consequentially, the conduit may rupture, which can have adverse environmental and financial repercussions.

To overcome these forces, conduit emplacement traditionally entails weighting a conduit with concrete weights, such as concrete arch structures that can be arranged in bridging relation over the top of the conduit. Such weighting devices, however, require pre-fabrication offsite, transportation to the place of conduit emplacement, and then installation about the conduit. These weighting devices are expensive to manufacture and transport, entail labour-intensive installation practices, and generally require increased trench dimensions so that their installation can be accommodated.

An alternative approach to such conduit emplacement techniques includes weighting a conduit with flexible weighting bags. These bags have a large compartment that can be filled with ballast material, such as gravel and coarse sand. Once filled, a weighting bag is positioned over a conduit such that the bag straddles the conduit, with the weight of the bag holding the conduit in position. Some weighting bags include means for preventing excessive compartment bulging when the bags are filled with ballast, such as cables or cords extending between compartment walls. Use of such cords and cables can render use of the bag cumbersome, and may weaken the walls where the cords and cables extend through. Further, where a bag has a single compartment for holding ballast, damage to the bag during installation can cause a free flow of the ballast to occur.

U.S. Pat. No. 9,217,516 discloses a conduit weighting device. The device is made of flexible material and has a top loading body for receiving ballast material, and a pair of legs adapted to straddle a conduit. The body has at least one inner panel extending between and joining sidewalls of the legs to prevent excessive bulging when filled with ballast. The panel also serves to divide the legs into multiple compartments for accepting ballast, thereby compartmentalizing the contained ballast to prevent ballast free flow should the device be damaged. The device may also include filling and hoisting loops for facilitating hoisting the weighting device when filled with ballast material and transporting it to a conduit emplacement.

While the conduit weighting device disclosed in U.S. Pat. No. 9,217,516 overcomes drawbacks and provides advantages over previous conduit emplacement approaches, there remains an ongoing need for further and improved techniques for conduit weighting.

BRIEF DESCRIPTION OF THE DRAWINGS

Embodiments will now be described, by way of example only, with reference to the attached Figures.

DETAILED DESCRIPTION

A conduit weighting device as disclosed herein may be used to counter post-installation displacement forces (e.g., buoyant hydrostatic forces, hydraulic flows associated with local ground water) that subterranean-emplaced conduits pipes, pipelines) may be subjected to, and which may undesirably affect conduit emplacement. Generally, the conduit weighting device comprises a container formed of flexible sheet material that is sized and shaped to be placed over and rested on a conduit emplaced within a trench. The container has a top opening to receive ballast, which may include backfill from the trench. Flaps extend from respective opposite edges of the top opening to facilitate filling the container with ballast after the device is installed in the trench. The conduit weighting device can be filled with ballast onsite after the device is emplaced in-trench over the conduit, thereby avoiding additional effort and cost associated with conventional methods of filling a weighting device with ballast off-site, transporting the filled device to the conduit-emplacement site, and installing the ballast-weighted device into the trench.

Figure 1:
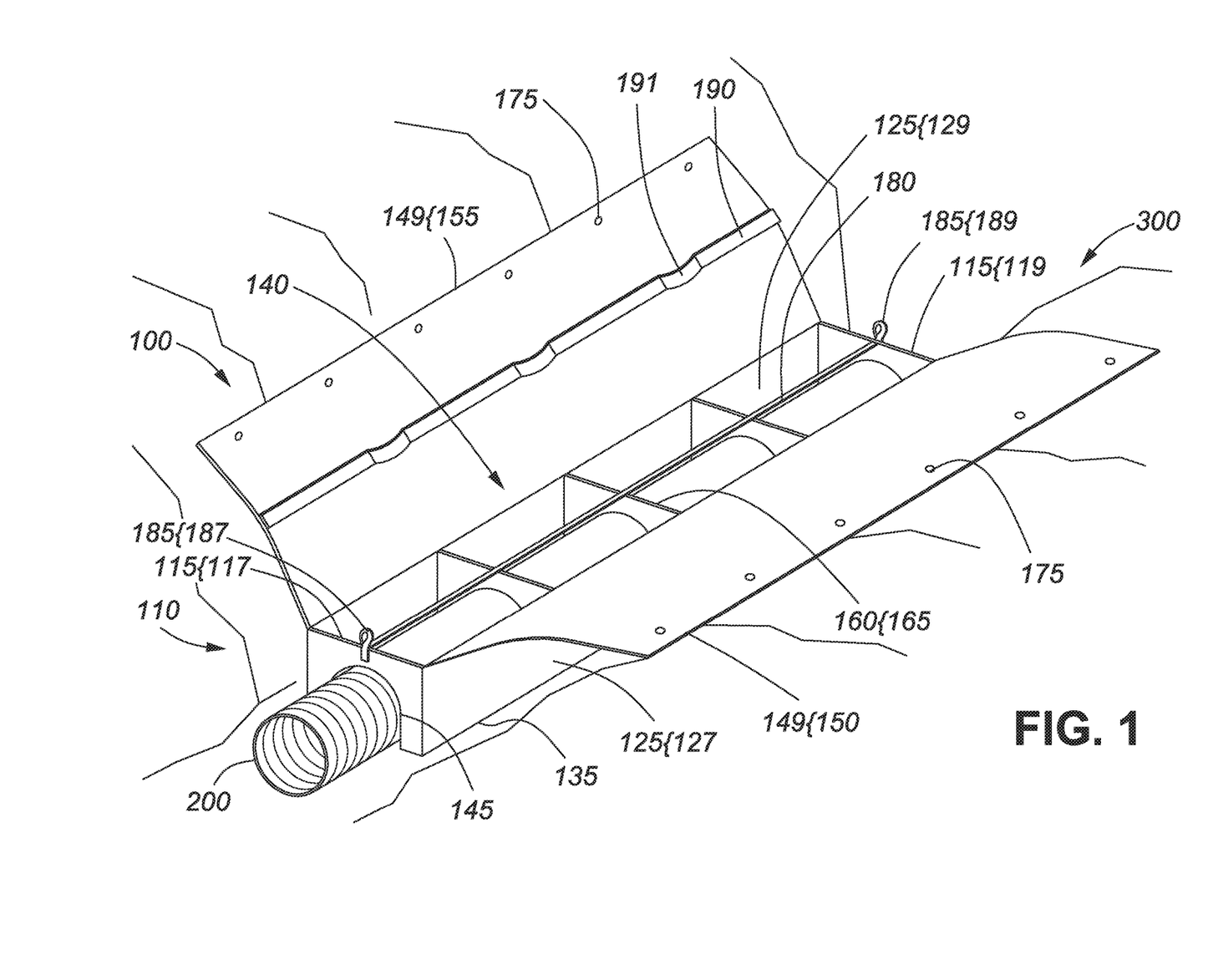
FIG. 1 shows a top right perspective view of an empty conduit weighting device installed on a conduit in a trench with flaps of the device in an open arrangement.

FIG. 1 shows a conduit weighting device 100 installed on a conduit 200 in a trench 300. The device 100 has a container 110 with end walls 115 including a first end wall 117 and a longitudinally opposing second end wall 119, sidewalls 125 including a first sidewall 127 and a transversely opposing second sidewall 129, a floor 135, and a top opening 140 formed by the end walls 115 and sidewalls 125. The container 110 has at least one flap 149 including a first flap 150 attached at or near a top edge of the first sidewall 127 and a second flap 155 attached at or near a top edge of the second sidewall 129. Each of the first flap 150 and the second flap 155 may have anchoring means to anchor or hold fast the flap at or near an adjacent edge of the trench when the flap is in an open arrangement, to maintain the flap in the open arrangement, and to provide structural reinforcement to the adjacent sidewall to facilitate filling of the container 110 with ballast 400 (see FIG. 4) through the top opening 140. The anchoring means may include at least one strap attached the flap, where the strap may include a loop for hooking or staking the strap in place. The anchoring means may include at least one hook or stake attached to the flap. The anchoring means may include a weight that is applied to the flap, such as stones, backfill, or a piece of machinery. The anchoring means may result from the weight, length, or fabric of the flap providing sufficient friction to maintain the flap in an open arrangement. The anchoring means may also include at least one grommet 175, as shown in FIG. 1, for passage of a stake or peg to be driven into the ground at the side of the trench. Other configurations are possible. The container 110 has an underside channel 145 formed by the first end wall 117, the second end wall 119, and the floor 135. The channel 145 may be sized and shaped such that the container 110 may conformingly straddle the conduit 200. Other configurations are possible.

Figure 2:
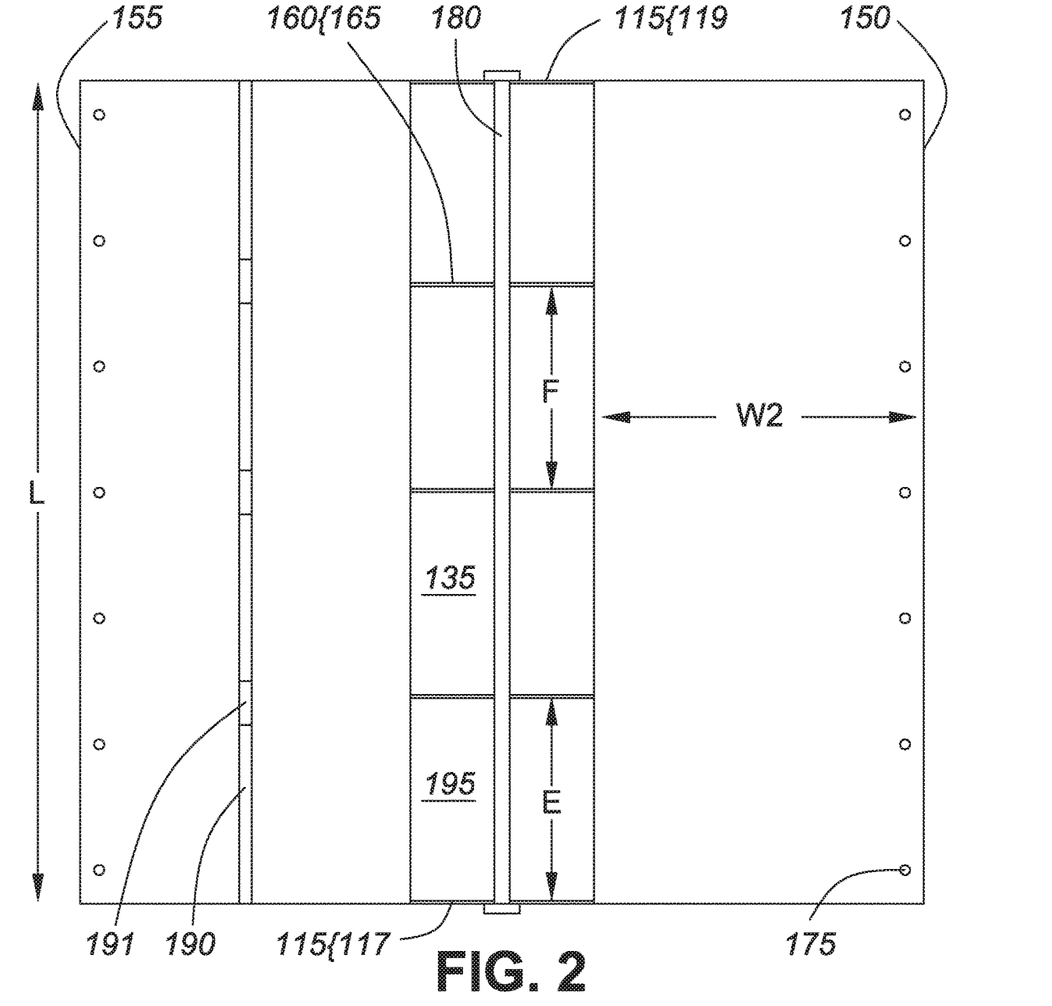
FIG. 2 shows an above plan view of the conduit weighting device of FIG. 1.
Figure 3:
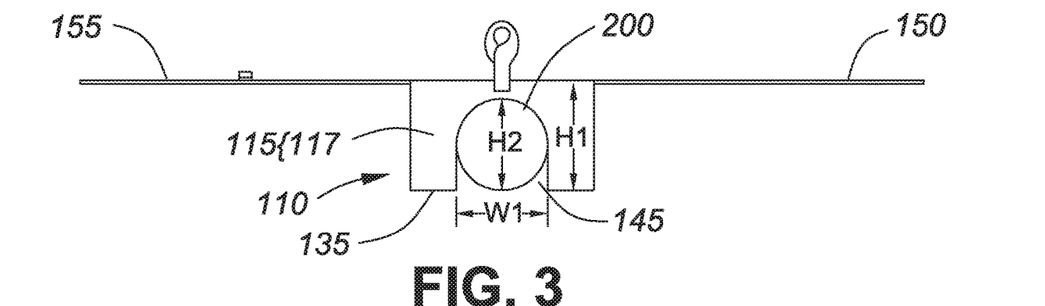
FIG. 3 shows a front view of the conduit weighting device of FIG. 1.

As depicted in FIGS. 1 to 3, the container 110 may have at least one baffle 160. In different embodiments, there may be up to 100 baffles, or from 1 to 100 baffles, or up to 50 baffles, or from 1 to 50 baffles, or up to 7 baffles, or from 3 to 7 baffles, or about 5 baffles. Each baffle 160 may be a transverse baffle 165 that joins and extends between the first sidewall 127 and the second sidewall 129, as shown in FIGS. 1 and 2. The baffle 160 may additionally or alternatively be a longitudinal baffle that joins and extends between the first end wall 117 and the second end wall 119. The container 110 may have a combination of at least one transverse baffle 165 and at least one longitudinal baffle. As best shown in FIG. 1, each baffle 160 may join the floor 135 and extend between the floor 135 and the top opening 140, or may be spaced from the floor 135 and/or the top opening 140. Other configurations are possible.

As further shown in FIG. 1, the container 110 may have a support strap 180 that joins and extends between the first end wall 117 and the second end wall 119. The container 110 may further have manipulation loops 185, including a first manipulation loop 187 attached to the first end wall 117, and a second manipulation loop 189 attached to the second end wall 119, useful for lifting and opening or expanding the weighting device 100. The support strap 180 may also join the least one baffle 160, or all of the baffles 160, as it extends between the end walls. Other configurations are possible.

As further depicted in FIGS. 2 & 3, the container 110 may have a height H1 and a length L. The height H1 may be between 1' and 20', or between 2' and 15', or between 4' and 8', or about 6'. The length L may be between 3' and 200', or between 5' and 30', or between 8' and 12', or about 10'. The pipe-receiving channel 145 may have a width W1 and height H2 that may be selected based on the size of the conduit 200 to be received therein. For example, the channel width W1 and height H2 may independently be greater than the width and height of the conduit 200, or the channel width W1 and height H2 may independently be approximately equal to the width and height of the conduit 200. As such, each of the channel width W1 and channel height H2 may be between 2.5" and 96", or between 15" and 70", or between 30" and 40", or about 4.5", or about 6.625", or about 8.625", or about 10.5", or about 12.75", or about 16", or about 20", or about 24", or about 30", or about 36", or about 42", or about 48". The channel width W1 and channel height H2 may be the same or different.

The first flap 150 and the second flap 155 may each have a flap width W2 that is selected based on a conduit depth D1 (see FIG. 4), which corresponds to the depth at which the conduit 200 is emplaced in the trench 300. Alternatively, the first flap 150 and the second flap 155 may each have a flap width W2 that is selected based on the size or width of the conduit 200. For example, the conduit depth D1 may be between 18" and 25', or between 3' and 16', or between 4' and 8', or between 5' and 9', or about 7'. The flap width W2 may be between 20% and 90%, or between 40% and 70%, or at least 40%, or about 60%, or at least 60%, or about 80%, of the conduit depth D1. As such, the flap width W2 may be between 1' and 20', or between 2' and 12', or between 3' and 5', or at least 4', or about 4'. When the baffle 160 is a transverse baffle 165, as shown in FIG. 2, the transverse baffle 165 may be spaced a distance E from the first end wall 117. When there is more than one baffle 165, pairs of baffles 165 may be spaced a distance F apart. Distances E and/or F may be varied such that a transverse baffle 165 divides the container 110 into separate compartments 195 that may or may not be of equal size. When the baffle 160 is a longitudinal baffle (not shown), the baffle may be spaced a distance EE from the first sidewall 127. When there is more than one baffle, pairs of baffles may be spaced a distance FF apart. Distances EE and/or FF may be varied such that baffle divides the container 110 into separate compartments that may or may not be of equal size. For example, the compartments may have a length that may be between 6" and 10', or between 10" and 6', or between 8" and 5', or between 1' and 4', or about 2'. Other configurations are possible.

The device 100 may be formed of any suitably flexible and durable material suitable to endure either subterranean conditions associated with conduit-emplacement, or other environmental conditions to which a particular application may leave it exposed. The material may be a woven material, or a breathable woven material. Alternatively, the material may include polymer products, such as polypropylene, polyester or nylon fabrics, that may be of a heavy gauge or a light gauge. The material may include woven geotextile fabric, or needle-punched geotextile fabric. The material may have a density of between 100 and 1000 grams per square metre (GSM), or between 200 and 600 GSM, or between 250 and 350 GSM, or about 300 GSM. When light gauge materials are used, the overall mass of the device 100 may be reduced relative to devices formed of heavy gauge materials, which may reduce manufacturing, transportation, and installation costs of the device 100 in-trench. The container 110 of the device 100, the first flap 150, and the second flap 155 may respectively be formed of different materials. For example, one or each of the flaps may be formed of stiff, coated fabrics (e.g., shiny side in, 270 gsm), and may include grommets 175 formed of plastic or metal, or fabric loops. The device 100 may include webbing formed of tensile polymer products such as polypropylene or polyethylene. For example, the support strap 180 and the support loops 185 may be formed of webbing. The device 100 may further include thread formed of high tensile standard bulk bag type polypropylene. Further combinations are possible.

Figure 4:
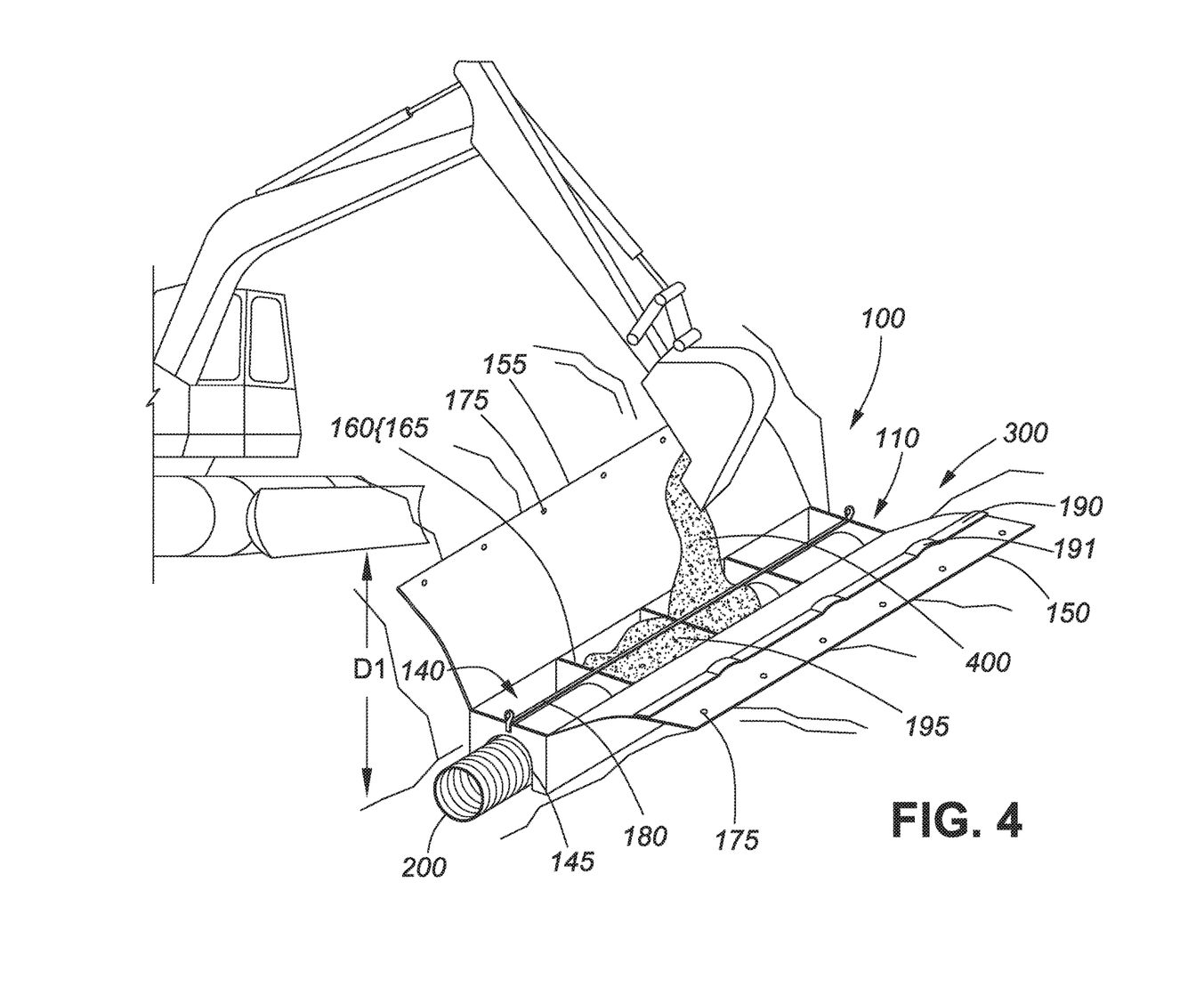
FIG. 4 shows a top right perspective view of the conduit weighting device of FIG. 1, showing ballast being filled into the device.

FIG. 4 shows the device 100 installed in the trench 300 being filled with ballast 400, with the first flap 150 and second flap 155 respectively extending beyond edges of the trench 300 in an open arrangement. The device 100 may be installed by way of carrying straps 190 attached to the device 100 (e.g., attached to the flaps 150 and 155). These carrying straps 190 may be used to lower the device 100 into the trench 300, and extend the device 100 over the conduit 200 by pulling the straps in opposite directions. For example, one or both of the flaps 150, 155 may have a carrying strap 190 affixed to the flap 150, 155, which may be at an inside surface of the flap 150, 155, and may form one or more handles 191, configured for grasping by one or more workers to carry the device 100 for placement on the conduit 200. For example, two workers standing on opposite sides of the trench 300 may each grasp a corresponding carrying strap 190 by one of more of its handles 191, and together carry the device 100 to a desired location and lower it into the trench 300 to rest on the conduit 200. Other installation means or configurations are possible. Particularly, the device 100 may be installed in-trench such that the conduit 200 is received within the channel 145 of container 110 while the device 100 is empty of any ballast. The first flap 150 and the second flap 155 may then be extended beyond edges of the trench 300, and may be anchored thereto in an open arrangement. As depicted in FIG. 4, each flap may be anchored via grommets 175 and cooperating means such as stakes or hooks. Other anchoring means are possible.

With the first flap 150 and the second flap 155 thus extended, the container 110 of the device 100 can be filled with ballast 400 from outside of the trench 300. As shown in FIG. 4, extended flaps 150 and 155 direct the ballast 400 into the container 110, and maintain the container 110 under tension to keep it from collapsing under the weight of the entering ballast. Particularly, as extended flaps 150 and 155 direct the ballast 400 into the container 110, the ballast 400 is separated into the compartments 195 formed by the baffle 160, which facilitates a safe distribution of the ballast 400 (e.g., increased safety factor with lower weight per compartment). As the ballast 400 fills the compartments 195 formed by the baffle 160, extended flaps 150 and 155 maintain those compartments under tension to keep them from collapsing under the weight of the entering ballast. In turn, the baffle 160 may tether the end walls 115 and/or sidewalls 125 such that the container 110 may resist excessive bulging when filled with ballast. The support strap 180 may also operate to resist excessive bulging of the end walls 115 and/or sidewalls 125 when the container 110 is filled with ballast. When joined with the baffle 160, the support strap 180 may also maintain the baffles 160 upright and may keep the compartments 195 from collapsing under the weight of the entering ballast.

The ballast 400 may be backfill material from the trench 300. Any suitable ballast material may be used, and may include sand, stone, or native soil.

Figure 5:
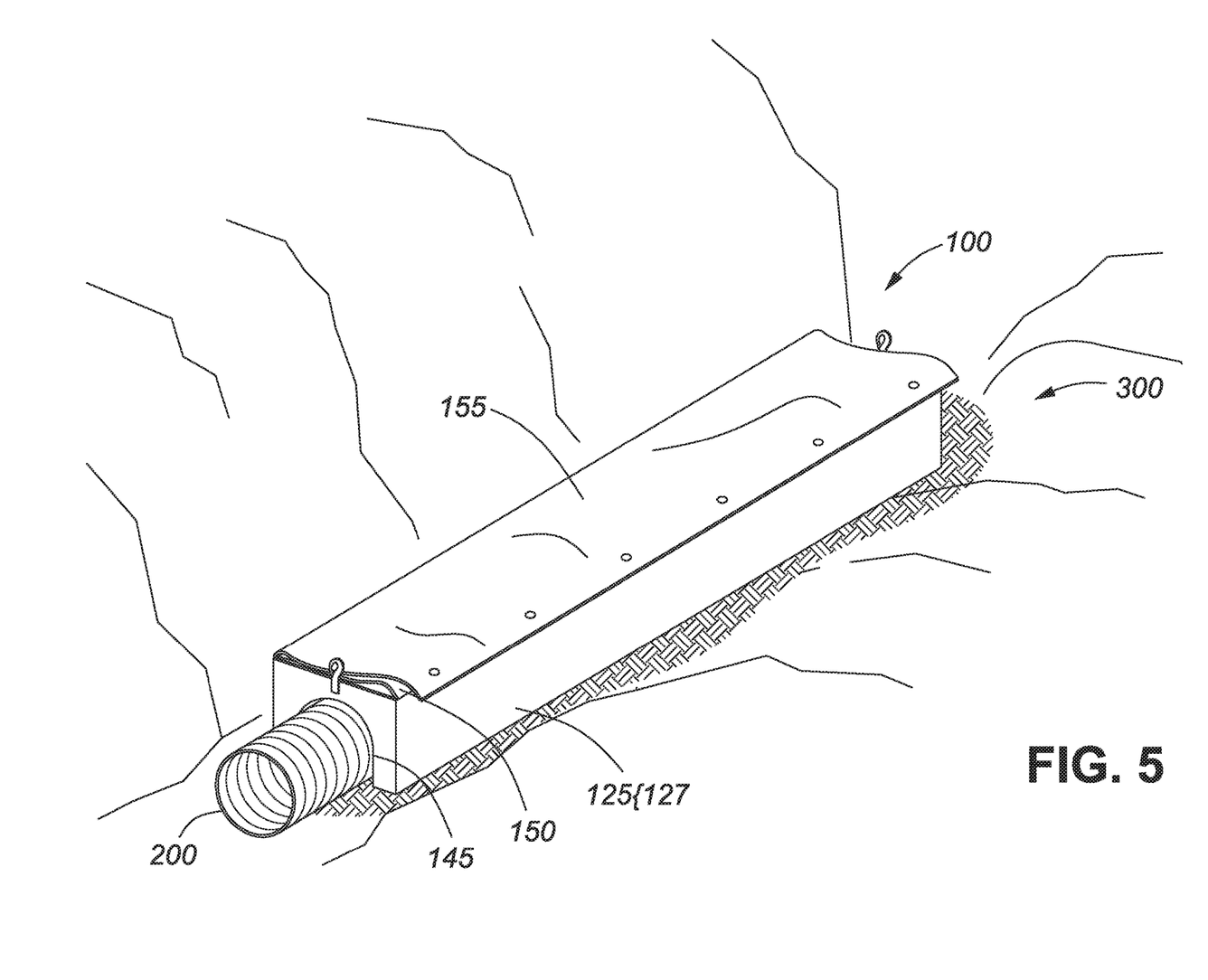
FIG. 5 shows a top right perspective view of the conduit weighting device of FIG. 1, with flaps of the device in a closed arrangement.

As depicted in FIG. 5, once the container 110 is filled with the ballast 400, flaps 150 and 155 are put n a closed arrangement to prepare the device 100 for subterranean burial. Particularly, once the container 110 is filled with ballast, flaps 150 and 155 may be folded over the top opening 140 to close the device 100. Alternatively or additionally, the workers may use long poles, which may be metal poles, to move and/or manipulate the device 100, which may include manipulating the flaps 150, 155 to move them into a closed configuration after the device 100 is filled with ballast. Alternatively or additionally, the device 100 may be provided with ropes (not shown) tied or otherwise affixed at edges of the flaps 150, 155, which may include at the grommets, which are pulled in a direction toward the opposite side of the trench, so as to pull the flap 150, 155 into the closed position. Other methods are possible.

The device 100 is not necessarily constrained in its application to any particular type of conduit. As such, the conduit 200 may include a conduit from a pipeline, and in particular a petroleum, petrochemical, or other chemical pipeline. Once in subterranean emplacement, the device 100 is adapted to provide isolation of the ballast 400 from external hydraulic flows. This is useful in situations where any substantial proportion of the ballast 400 comprises materials other than coarse mineral materials, as finer materials may otherwise be carried off by hydraulic flows. Moreover, when non-isolated, unconsolidated ballast is relied upon to secure a conduit emplacement, the ballast which acts to secure the conduit is primarily limited to a mass of vertical overburden, and mechanical shear characteristics thereof. As such, in situations where a vertical overburden, such as trench backfill for example, is relied upon to hold a conduit in position, a certain minimum height of overburden (typically specified in the art as a "unit weight" parameter of any particular overburden material) is required to deal with any anticipated displacement forces. The unit weight of an enclosed but otherwise unconsolidated ballast (i.e., the ballast 400 in the device 100) can secure a conduit emplacement without necessarily having ballast arranged vertically above the conduit; and, thus, conduit emplacement using device 100 may need not be as deep.

The device 100 as described herein has the ability to be filled on-site and in-trench. This ability is facilitated by the flaps 150 and 155 that simultaneously help to hold open the device 100, and help to direct ballast 400 into the device after it has been installed around the conduit 200. Other conduit weighting devices typically require pre-filling or pre-casting of the device with ballast, transporting the subsequently weighted device to a worksite, and then installing it around a conduit in-trench. This results in weighting devices that are more expensive to make and transport, more labour intensive to install, and may require a larger trench to be dug to accommodate them. In contrast, the device 100 may be formed of lighter gauge material, transported in a compact form (e.g., folded), and installed around a conduit while the device is empty. As the device 100 does not need to be filled with ballast off-site, the device 100 may be formed of light gauge material with fewer support straps and/or hoisting straps than would otherwise be required for other conduit weighting devices. Further, the ballast used with the device 100 may be backfill that is already on-site, dug out from the trench into which the conduit is being installed. For other conduit weighting devices that are pre-filled or pre-cast with ballast off-site, it may be necessary for ballast to be transported to the manufacturing site of the device, further increasing manufacturing and transportation costs. That the device 100, by way of flaps 150 and 155, may be formed of less durable material with fewer straps, may be transported in a compact form, and may be installed on-site while empty, reduces manufacturing, transportation, and installation costs of the device.

The following are examples according to the disclosure herein.

Example 1. A conduit weighting device comprising: a container to contain ballast, the container being formed from flexible sheet material and having a top opening to receive the ballast; and flaps extending from respective opposite edges of the top opening of the container, wherein: the container forms an underside channel sized and shaped to receive a conduit for conforming placement of the conduit weighting device on the conduit to weight the conduit; and the flaps are sized and shaped: when in an open arrangement, to extend beyond edges of a trench containing the conduit to hold open the top opening while receiving the ballast material; and when in a closed arrangement, to close the top opening of the container.

Example 2. The conduit weighting device according to Example 1, wherein: the container comprises opposing end walls, opposing sidewalls joining the end walls, and a floor joining the end walls and sidewalls.

Example 3. The conduit weighting device according to Example 1 or 2, wherein: the underside channel is formed by the end walls and floor.

Example 4. The conduit weighting device according to any one of Examples 1 to 3, wherein: the underside channel is sized and shaped such that when the conduit is received in the underside channel the conduit weighting device straddles the conduit.

Example 5. The conduit weighting device according to any one of Examples 1 to 4, wherein: a top end of the underside channel has a generally semicylindrical shape.

Example 6. The conduit weighting device according to any one of Examples 1 to 5 further comprising: at least one baffle joined to the container to divide the container into a plurality of compartments such that the ballast received in the container is contained separately in the plurality of compartments.

Example 7. The conduit weighting device according to Example 6 when dependent on Example 2, wherein: at least one of the baffles is a transverse baffle that joins and extends between the sidewalls.

Example 8. The conduit weight device according to Example 7, wherein: the transverse baffle is operative to tether the sidewalls to resist bulging or collapse of the sidewalls when the ballast is received in the container.

Example 9. The conduit weighting device according to any one of Examples 6 to 8 when dependent on Example 2, wherein: at least one of the baffles is a longitudinal baffle that joins and extends between the end walls.

Example 10. The conduit weight device according to Example 9, wherein: the longitudinal baffle is operative to tether the end walls to resist bulging or collapse of the end walls when the ballast is received in the container.

Example 11. The conduit weighting device according to any one of Examples 6 to 10 when dependent on Example 2, wherein: at least one of the baffles further joins the floor, and extends between the floor and top opening.

Example 12. The conduit weighting device according to any one of Examples 1 to 11, wherein each of the flaps has a flap width of at least 4'.

Example 13. The conduit weighting device according to Example 12, wherein: the channel width is approximately equal the width of the conduit.

Example 14. The conduit weighting device according to any one of Examples 1 to 13, wherein: the flaps each comprise anchor means to anchor the flap at or near a corresponding trench edge.

Example 15. The conduit weighting device according to Example 14, wherein: the anchor means comprise at least one opening, loop, or ring sized and shaped to receive an anchor.

Example 16. The conduit weighting device according to Example 15, wherein: the anchor means comprise at least one grommet.

Example 17. The conduit weighting device according to any one of Examples 1 to 16, wherein: the flaps are formed of the flexible sheet material.

Example 18. The conduit weighting device according to any one of Examples 1 to 17, wherein the flexible sheet material comprises polypropylene, polyester, or nylon fabrics.

Example 19. The conduit weighting device according to any one of Examples 1 to 18, wherein the flexible sheet material comprises a woven geotextile fabric or a needle-punched geotextile fabric.

Example 20. The conduit weighting device according to any one of Examples 1 to 19, wherein the flexible sheet material has a density of between 250 and 350 grams per square metre.

Example 21. The conduit weighting device according to any one of Examples 1 to 20, further comprising: a support strap joining and extending between opposing walls of the container and operative to resist bulging of the opposing walls when the ballast is received in the container.

Example 22. The conduit weighting device according to Example 21 when dependent on Example 2, wherein: the opposing walls are the end walls.

Example 23. The conduit weighting device according to Example 21 when dependent on Example 2, wherein: the opposing walk are the sidewalls.

Example 24. The conduit weighting device according to Example 22 or 23 when dependent on Example 6, wherein: the support strap further joins the at least one baffle to resist bulging or collapse of the baffle when the ballast is received in the container.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A conduit weighting device, for weighting a conduit in a trench having opposing edges and a depth, the conduit weighting device comprising:
    a container to contain ballast, the container being formed from flexible sheet material and having a top opening to receive the ballast; and
    flaps extending from and attached only to respective opposite longitudinal edges of the top opening of the container,
    wherein:
    the container forms an underside channel sized and shaped to receive the conduit for conforming placement of the conduit weighting device on the conduit to weight the conduit; and
    each of the flaps has a width extending away from the respective longitudinal edge of the top opening and greater than the distance between the opposite longitudinal edges of the top opening of the container and the flaps are sized and shaped relative to the depth of the trench:
        when in an open arrangement, to extend beyond the edges of the trench containing the conduit to hold open the top opening to direct and receive the ballast material; and
        when in a closed arrangement, to close the top opening of the container.

2. The conduit weighting device according to claim 1, wherein the container comprises opposing end walls, opposing sidewalls joining the end walls, and a floor joining the end walls and sidewalls.

3. The conduit weighting device according to claim 2, wherein the underside channel is formed by the end walls and floor.

4. The conduit weighting device according to claim 1, wherein the underside channel is sized and shaped such that when the conduit is received in the underside channel the conduit weighting device straddles the conduit.

5. The conduit weighting device according to claim 1, wherein a top end of the underside channel has a generally semicylindrical shape.

6. The conduit weighting device according to claim 1 further comprising at least one baffle joined to the container to divide the container into a plurality of compartments such that the ballast received in the container is contained separately in the plurality of compartments.

7. The conduit weighting device according to claim 6, wherein:
the container comprises opposing end walls, opposing sidewalls joining the end walls, and a floor joining the end walls and sidewalls; and
at least one of the baffles is a transverse baffle that joins and extends between the sidewalls.

8. The conduit weight device according to claim 7, wherein the transverse baffle is operative to tether the sidewalls to resist bulging or collapse of the sidewalls when the ballast is received in the container.

9. The conduit weighting device according to claim 6, wherein:
container comprises opposing end walls, opposing sidewalls joining the end walls, and a floor joining the end walls and sidewalls; and
at least one of the baffles further joins the floor, and extends between the floor and top opening.

10. The conduit weighting device according to claim 1, wherein the width of each of the flaps is at least 4' so that when the flaps are in the open arrangement the flaps direct the ballast material into the container and maintain the container under tension to keep the container from collapsing under the weight of the entering ballast.

11. The conduit weighting device according to claim 10, wherein a width of the underside channel is approximately equal to a conduit width of the conduit.

12. The conduit weighting device according to claim 10, wherein a channel width and a channel height of the underside channel are each between 30" and 40".

13. The conduit weighting device according to claim 1, wherein the flaps each comprise anchor means to anchor the flap at or near a corresponding trench edge.

14. The conduit weighting device of claim 13, wherein the anchor means comprise a plurality of openings, loops, or rings each sized and shaped to receive an anchor, and distributed along substantially an entire length of each outer longitudinal edge of the flaps.

15. The conduit weighting device according to claim 14, wherein the anchor means comprise grommets.

16. The conduit weighting device according to claim 1, wherein the flaps are formed of the flexible sheet material.

17. The conduit weighting device according to claim 1, wherein the flexible sheet material comprises polypropylene, polyester, or nylon fabrics.

18. The conduit weighting device according to claim 1, wherein the flexible sheet material comprises a woven geotextile fabric or a needle-punched geotextile fabric.

19. The conduit weighting device according to claim 1, wherein the flexible sheet material has a density of between 250 and 350 grams per square meter.

20. The conduit weighting device according to claim 1, further comprising a support strap joining and extending between opposing walls of the container and operative to resist bulging of the opposing walls when the ballast is received in the container.

21. The conduit weighting device according to claim 20, wherein:
the container comprises opposing end walls, opposing sidewalls joining the end walls, and a floor joining the end walls and sidewalls; and
the opposing walls are the end walls.

22. The conduit weighting device according to claim 21, further comprising at least one baffle joined to the container to divide the container into a plurality of compartments such that the ballast received in the container is contained separately in the plurality of compartments, wherein the support strap further joins the at least one baffle to resist bulging or collapse of the baffle when the ballast is received in the container.

23. The conduit weighting device according to claim 1, further comprising affixed to an inside surface of at least one of the flaps, a carrying strap extending substantially an entire length of the flap, the carrying strap comprising one or more handles graspable by one or more workers to carry the conduit weighting device and lower the conduit weighting device into the trench for placement on the conduit.

24. The conduit weighting device according to claim 1, wherein the flap width of each flap is at least 60% of a conduit depth of the conduit in the trench so that when the flaps are in the open arrangement the flaps direct the ballast material into the container and maintain the container under tension to keep the container from collapsing under the weight of the entering ballast.

\* \* \* \* \*